United States Patent
Zhu et al.

(10) Patent No.: US 11,472,262 B2
(45) Date of Patent: Oct. 18, 2022

(54) HEAT PUMP AIR-CONDITIONING SYSTEM FOR VEHICLE

(71) Applicant: DENSO CORPORATION, Kariya (JP)

(72) Inventors: Jingyi Zhu, Shanghai (CN); Zhaoliang Xu, Shanghai (CN); Ziliang Yin, Shanghai (CN)

(73) Assignee: DENSO CORPORATION, Kariya (JP)

( * ) Notice: Subject to any disclaimer, the term of this patent is extended or adjusted under 35 U.S.C. 154(b) by 51 days.

(21) Appl. No.: 17/194,353

(22) Filed: Mar. 8, 2021

(65) Prior Publication Data

US 2021/0309076 A1 Oct. 7, 2021

(30) Foreign Application Priority Data

Apr. 2, 2020 (CN) .......................... 202010255224.2

(51) Int. Cl.
*B60H 1/00* (2006.01)

(52) U.S. Cl.
CPC .................... *B60H 1/00921* (2013.01); *B60H 2001/00928* (2013.01); *B60H 2001/00949* (2013.01)

(58) Field of Classification Search
CPC ........ B60H 1/00921; B60H 2001/0928; B60H 2001/00949
USPC ....................................................... 165/202
See application file for complete search history.

(56) References Cited

U.S. PATENT DOCUMENTS

| 6,604,576 B2 * | 8/2003 | Noda ................. B60H 1/00878 165/203 |
| 2005/0034473 A1 | 2/2005 | Casar et al. |
| 2016/0297283 A1 | 10/2016 | Sakamoto et al. |
| 2018/0319254 A1 | 11/2018 | Hotzel et al. |
| 2019/0023100 A1 | 1/2019 | Suzuki et al. |

FOREIGN PATENT DOCUMENTS

| DE | 10163607 A1 | 7/2003 |
| DE | WO2012076237 | * 10/2011 |
| DE | 112014005360 T5 | 8/2016 |
| DE | 112017000368 T5 | 10/2018 |
| DE | 102017109309 A1 | 11/2018 |
| DE | 102017211397 A1 | 1/2019 |
| JP | 2014-163628 A | 9/2014 |
| JP | 2016-132271 A | 7/2016 |
| JP | 2017-165142 A | 9/2017 |

* cited by examiner

*Primary Examiner* — Davis D Hwu
(74) *Attorney, Agent, or Firm* — Harness, Dickey & Pierce, P.L.C.

(57) ABSTRACT

A heat pump air-conditioning system for a vehicle includes a refrigerant circuit, an auxiliary heater, and a control unit. The control unit compares a difference between a target blowout temperature and an actual blowout temperature with a predetermined first temperature threshold value in magnitudes, The control unit adjusts an opening degree of a first expansion valve and an opening degree of a second expansion valve. The control unit adjusts an output power of the auxiliary heater. The control unit executes a plurality of different modes of a heat pump air-conditioning to control the actual blowout temperature to approach and maintain at the target blowout temperature.

10 Claims, 3 Drawing Sheets

HEAT PUMP AIR-CONDITIONING SYSTEM FOR VEHICLE

CROSS REFERENCE TO RELATED APPLICATIONS

The present application is based on and claims the benefit of priority from Chinese Patent Application No. 202010255224.2 filed in China filed on Apr. 2, 2020, the entire disclosure of the above application is incorporated herein by reference.

TECHNICAL FIELD

The present disclosure relates to an air-conditioner for a vehicle. This disclosure specifically relates to a heat pump air-conditioning system for a vehicle.

BACKGROUND

A heat pump air-conditioning system for a vehicle is under development. The heat pump system may selectively heat and cool a vehicle room. The heat pump system may be required to perform a dehumidifying operation which decreases a humidity in the vehicle room to avoid windows from fogging. In addition, the heat pump system is required to be an energy conservative system. In the above aspects, or in other aspects not mentioned, there is a need for further improvements in the heat pump air-conditioning system for a vehicle.

SUMMARY

A heat pump air-conditioning system for a vehicle in this disclosure comprises a refrigerant circuit which heats air directly or indirectly and includes a compressor, a first heat exchanger, a first expansion valve, a second heat exchanger, a second expansion valve, a third heat exchanger, and a liquid tank connected in this order, and a two-way valve installed in parallel with a series connection of the second expansion valve and the third heat exchanger. The heat pump air-conditioning system has an auxiliary heater which heats the air directly or indirectly. The heat pump air-conditioning system has a control unit which controls a plurality of elements including the first expansion valve, the second expansion valve, and the auxiliary heater. The control unit is configured to perform the following methods. The control unit sets a target blowout temperature for air-conditioning and acquires an actual blowout temperature at an air-conditioning air outlet portion. The control unit compares a difference between a target blowout temperature and an actual blowout temperature with a predetermined first temperature threshold value in magnitudes, the first temperature threshold value being a positive value. The control unit is configured to control the actual blowout temperature to approach to and maintain at the target blowout temperature by adjusting the opening degrees of the first expansion valve and the second expansion valve and adjusting the auxiliary heater based on the comparison result, and perform different modes of heat pump air-conditioning.

According to this disclosure, an auxiliary heater is used. The disclosure performs the dehumidifying and heating function by increasing a cooperative associated control of the auxiliary heater and the expansion valves. As a result, it is possible to simplify the entire heat pump air-conditioning system and perform the dehumidifying and heating function. in addition, a heat pump air-conditioning system for a vehicle can provide an energy conservation property and comfort.

In this disclosure, the heat pump air-conditioning system further includes a water circuit. The water is a secondary thermal medium to convey a thermal energy. The water may be called a cooling water or a thermal medium. The auxiliary heater is installed in the water circuit and are used to heat the water. The water circuit further includes a water pump for pumping and circulating the water, and a fourth heat exchanger which performs heat exchange with the air to be introduced into the vehicle room. The refrigerant circuit and the water circuit performs heat exchange and the water is heated/cooled via the refrigerant at the first heat exchanger. The water heated/cooled in the fourth heat exchanger heats/cools the air to be introduced into the vehicle room.

In this disclosure, the control unit compares the difference between the target blowout temperature and the actual blowout temperature with the predetermined first temperature threshold value, and executes the following modes different from each other in accordance with the comparison result. The control unit is configured to perform a first mode in a case that the difference is less than the first temperature threshold value, the first mode being performed by not activating the auxiliary heater and adjusting both the opening degree of the first expansion valve and the opening degree of the second expansion valve. The control unit is configured to perform a third mode in a case that the difference is equal to or greater than the first temperature threshold value, the third mode being performed by activating the auxiliary heater and adjusting both the opening degree of the first expansion valve and the opening degree of the second expansion valve.

As a result, it is possible to switch between the first mode and the third mode based on a magnitude relationship between the difference between the target blowout temperature and the actual blowout temperature and the predetermined first temperature threshold value.

In this disclosure, the control unit further compares a target blowout temperature with an actual blowout temperature in magnitudes in a situation where the difference is less than the first temperature threshold value and the first mode is performed. The control unit is configured to control the actual blowout temperature to approach to and maintain at the target blowout temperature by decreasing the opening degree of the first expansion valve and increasing the opening degree of the second expansion valve in a case that the target blowout temperature is greater than the actual blowout temperature. The control unit is configured to control the actual blowout temperature to approach to and maintain at the target blowout temperature by increasing the opening degree of the first expansion valve and decreasing the opening degree of the second expansion valve in a case that the target blowout temperature is equal to or less than the actual blowout temperature. The control unit is configured to control the actual blowout temperature to approach to and maintain at the target blowout temperature by decreasing the opening degree of the first expansion valve and increasing the opening degree of the second expansion valve in a situation where the difference is equal to or greater than the first temperature threshold value and the third mode is performed.

Thereby, it is possible to control the actual blowout temperature to approach and maintain at the target blowout temperature by adjusting the opening degrees of the two expansion valves under the first mode or the third mode.

In this disclosure, the control unit continuously measures the opening degree mode of the first expansion valve and the second expansion valve in a real time manner in a situation where the first mode is performed. The control unit compares a measured opening mode with a predetermined opening threshold value. The control unit compares a difference between the target blowout temperature and the actual blowout temperature with a predetermined second temperature threshold value in magnitudes, the second temperature threshold value being a positive value less than the predetermined first temperature threshold value. The control unit switches the modes of heat pump air-conditioning based on the comparison result. The control unit is configured to switch to the second mode in a case that the opening mode is equal to or less than the opening threshold value and the difference is greater than the second temperature threshold value, in this mode the auxiliary heater being activated and both the opening degree of the first expansion valve and the opening degree of the second expansion valve being maintained unchanged.

As a result, it is possible to switch from the situation of the first mode to the second mode based on both comparison between the opening degree mode of two expansion valves and the predetermined opening degree threshold value, and a magnitude relationship between the difference between the target blowout temperature and the actual blowout temperature and the predetermined second temperature threshold value.

In this disclosure, the control unit is configured to continuously measure a current output power of the auxiliary heater in a real time manner in a situation where the second mode is performed. The control unit is configured to compare the measured output power with a predetermined power threshold value THc. The control unit is configured to compare a difference between a target blowout temperature and an actual blowout temperature with a predetermined first temperature threshold value in magnitudes. The control unit is configured to switch the modes of heat pump air-conditioning based on the comparison result. The control unit is configured to switch to the first mode in a case that both the output power is equal to or less than the power threshold value and the difference is greater than the second temperature threshold value.

As a result, it is possible to switch from the situation of the second mode to the first mode based on both comparison between the output power of the auxiliary heater at present time and the predetermined power threshold value, and a magnitude relationship between a difference between the actual blowout temperature and the target blowout temperature and the predetermined second temperature threshold value. The difference between the target blowout temperature and the actual blowout temperature can be called a first difference. The difference between the actual blowout temperature and the target blowout temperature can be called a second difference.

In this disclosure, the control unit is configured to continuously measure the actual blowout temperature of the air-conditioning air outlet portion in a real time manner in a situation where the first mode is performed. The control unit is configured to compare a difference between a target blowout temperature and an actual blowout temperature with a predetermined first temperature threshold value in magnitudes. The control unit is configured to switch the modes of heat pump air-conditioning based on the comparison result. The control unit is configured to switch to the third mode in a case that the difference is equal to or greater than the first temperature threshold value. The control unit is configured to continuously measure the actual blowout temperature at the air-conditioner air outlet portion in a real time manner in a situation where the third mode is performed. The control unit is configured to compare the difference between the target blowout temperature and the actual blowout temperature with the predetermined first temperature threshold value in magnitudes. The control unit is configured to switch the modes of heat pump air-conditioning based on the comparison result. The control unit is configured to switch to the first mode in a case that the difference is less than the first temperature threshold.

Thereby, it is possible to perform bidirectional switching between the first mode and the third mode.

In this disclosure, the auxiliary heater may be PTC electric heater.

In this disclosure, the modes may be a first mode, a second mode, and a third mode. The first mode may be an energy conservation mode. The second mode may be an energy conservation and auxiliary heating mode. The third mode is a quick heating priority mode.

This disclosure uses the auxiliary heater, increases an cooperative associated operation of the auxiliary heater and the expansion valve, and executes three types of modes (the energy conservation mode, the energy conservation and auxiliary heating mode, and the quick heating priority mode. As a result, this disclosure makes it possible to simplify an entire system, to perform a dehumidifying and heating function, and to enable both the energy conservation property and comfort at the same time.

In this disclosure, the control unit comprises at least one processor circuit.

BRIEF DESCRIPTION OF THE DRAWINGS

The disclosure is further described with reference to the accompanying drawings in which.

DESCRIPTION OF EMBODIMENT

Generally, a heat pump air-conditioning systems for vehicles provide a dehumidifying and heating function in a mid-season (i.e., spring and autumn). The dehumidifying and heating function dissipates heat and dehumidifies a vehicle room simultaneously. Normally, a temperature in the vehicle room is adjusted by adjusting an amount of heat absorption and heat dissipation from an outdoor heat exchanger of a heat pump air-conditioning system for a vehicle.

In one example, in order to increase an amount of heat radiated into the vehicle room and increase an amount of heat absorbed by an outdoor heat exchanger, a series operation state in which the outdoor heat exchanger and an indoor evaporator are connected in series is adopted. In this series operation state, the amount of heat absorbed by the outdoor heat exchanger is adjusted by adjusting a valve connected to the outdoor heat exchanger. In a case that the amount of heat absorption is insufficient, a parallel operation state in which the outdoor heat exchanger and the indoor evaporator are connected in parallel is adopted. The parallel operation state makes it possible to increase the amount of heat absorbed by the outdoor heat exchanger. However, since two types of methods, series and parallel, must be used, the structure of the heat pump air-conditioning system becomes complicated.

In another example, the series operation state is adopted. In this example, the heat pump air-conditioning system is simplified by switching directly to a heating mode when a temperature is not sufficient. However, in this example, since it does not have a dehumidifying function, a vehicle window may become cloudy.

In the above aspects, or in other aspects not mentioned, there is a need is for further improvements in the heat pump air-conditioning system for a vehicle. It is an object of this disclosure to provide a heat pump air-conditioning system for a vehicle which performs a dehumidifying and heating function with a relatively simple configuration. It is an additional object of this disclosure to provide a heat pump air-conditioning system for a vehicle which performs comfortable air-conditioning by efficiently using energy. A property of efficiently using energy is also referred to as an energy conservation property in the following description.

Several embodiments are described with reference to the drawings. In some embodiments, functionally and/or structurally corresponding and/or associated elements may be given the same reference numerals, or reference numerals with different digit placed on equal to or higher than a hundred place. For corresponding parts and/or associated elements, it is possible to make reference to the description of other embodiments. Although the disclosure is described by associating the drawings and the following embodiments, it should be understood that the drawings and the following embodiments merely describe the disclosure and do not limit the scope of the disclosure.

The existing heat pump air-conditioning system for vehicles having a dehumidifying and heating function has a problem that the structure is complicated. This disclosure simplifies the entire heat pump air-conditioning system for a vehicle. It is an object of the present disclosure to provide a heat pump air-conditioning system for a vehicle which can perform a dehumidifying and heating function and also provide both the energy conservation property and comfort. The so-called heat pump air-conditioning system refers to an air-conditioning refrigerant system capable of both heating and cooling. The heat pump air-conditioning system is different from a system which uses a waste heat of an engine for heating and has an air-conditioning refrigerant system for cooling. In the following description, the heat pump air-conditioning system may also be abbreviated as a heat pump (HP).

First Embodiment

Figure 1:
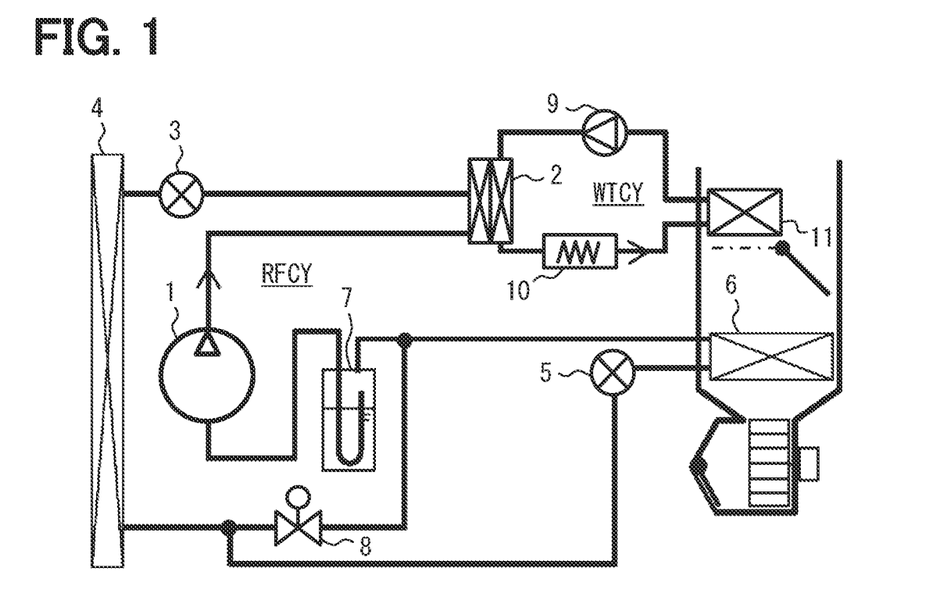
FIG. 1 is a block diagram showing a heat pump air-conditioning system for a vehicle according to a first embodiment.

FIG. 1 shows a schematic structural diagram of a heat pump air-conditioning system for a vehicle based on a first embodiment of the disclosure. As shown in FIG. 1, the heat pump air-conditioning system of the present embodiment has a refrigerant circuit RFCY. The refrigerant circuit RFCY includes a compressor 1, a first heat exchanger 2, a first expansion valve 3, a second heat exchanger 4, a second expansion valve 5, a third heat exchanger 6, and a liquid tank 7 connected in this order. The refrigerant circuit RFCY further includes a two-way valve 8 installed in parallel with a series circuit which includes the second expansion valve 5 and the third heat exchanger 6. The refrigerant circuit RFCY directly or indirectly heats a conditioned air at least and additionally cools the conditioned air. The heat pump air-conditioning system further includes an auxiliary heater which generates heat by electric energy. The auxiliary heater heats the conditioned air directly or indirectly. The compressor 1 is an electric compressor. The first heat exchanger 2 is a heat exchanger between the refrigerant and a water. The first heat exchanger 2 is a water-cooled condenser 2 in the present embodiment, and is provided in the engine room. The second heat exchanger 4 and the third heat exchanger 6 are heat exchangers between the refrigerant and air. The third heat exchanger 6 is located in an air-conditioning box in a vehicle room as an indoor evaporator 6. The second heat exchanger 4 is located outside the vehicle. The second heat exchanger 4 may be referred to as an outdoor heat exchanger 4 in the following description. The first expansion valve 3 and the second expansion valve 5 are electronic expansion valves (EXV) whose opening degree can be controlled by an electric signal.

As shown in FIG. 1 the heat pump air-conditioning system of the present embodiment further includes a water circuit WTCY. The water heater 10 as the auxiliary heater is installed in the water circuit WTCY and is used to heat the water. The water circuit WTCY further includes a water pump 9 for pumping and circulating the water, and a fourth heat exchanger 11 for heat exchange with the air to be introduced into the vehicle room. The refrigerant circuit RFCY and the water circuit WTCY perform heat exchange at the first heat exchanger 2, heat/cool the water through the refrigerant, and heat/cool the air to be introduced into the vehicle room at the fourth heat exchanger 11 by using heated/cooled water. The fourth heat exchanger 11 is a heat exchanger (H/C) 11 which performs heat exchange between the water and air. The heat exchanger 11 may be referred to as a water-air heat exchanger or a heater core. The heat exchanger 11 is also located in the air conditioning box inside the vehicle.

The water heater 10 may be an electric heater, and in the present is embodiment, for example, a PTC electric heater. The water heater 10 mainly performs auxiliary heating when an amount of heat of the water-cooled condenser 2 is insufficient. For example, in a case that the target blowout temperature of the air outlet in the vehicle is 55 degrees, the water temperature at the inlet of the heat exchanger 11 must be 56 degrees in order to reach the target blowout temperature. However, when the outlet temperature of the water-cooled condenser (i.e., a capacity of HP) is only 52 degrees Celsius, the water temperature is heated from 52 degrees Celsius to 56 degrees Celsius by the water heater 10. This auxiliary heating makes it possible to blow out air at 55 degrees Celsius into the room. In the present embodiment, the water heater 10 can be installed upstream of the heat exchanger 11. The water pump 9 is installed downstream of the heat exchanger 11, and the cooling water in the cooling water circuit can be flowed by the operation of the water pump 9.

Further, a bypass is formed between the second heat exchanger 4 and the second expansion valve 5 which is directly connected to the liquid tank 7 via the two-way valve 8. The bypass may be usually called a heating circuit.

In the heat pump air-conditioning system for a vehicle, the dehumidifying mode is executed in a form in which the outdoor heat exchanger 4 and the indoor evaporator 6 are connected in series. The outdoor heat exchanger 4 can absorb or dissipate heat based on the height of the blowout temperature required in the vehicle. Specifically, an amount of heat absorbed by the outdoor heat exchanger 4 can be controlled by controlling the opening degrees of the first expansion valve 3 and the second expansion valve 5. The amount of heat absorbed increases as the opening degree of the first expansion valve 3 decreases and the opening degree of the second expansion valve 5 increases. Contrary, when the opening degree of the first expansion valve 3 becomes large and the opening degree of the second expansion valve 5 becomes small, the amount of heat absorption becomes small. The blowout temperature at the air outlet portion in the vehicle (hereinafter abbreviated as the blowout temperature) is controlled by adjusting an amount of heat absorption. For example, the opening degrees of the first expansion valve 3 and the second expansion valve 5 may be adjusted based on a difference between a water temperature at an arbitrary time point (for example, the current time point) and a target water temperature. The water temperature at any time point can be measured by, for example, a water temperature sensor. Further, in a case that the blowout temperature of the air outlet is insufficient, it is possible to activate the auxiliary heater and to heat the air. For example, an output power of the PTC electric heater may be controlled linearly or stepwise based on the difference between the water temperature at any time point and the target water temperature.

Figure 4:
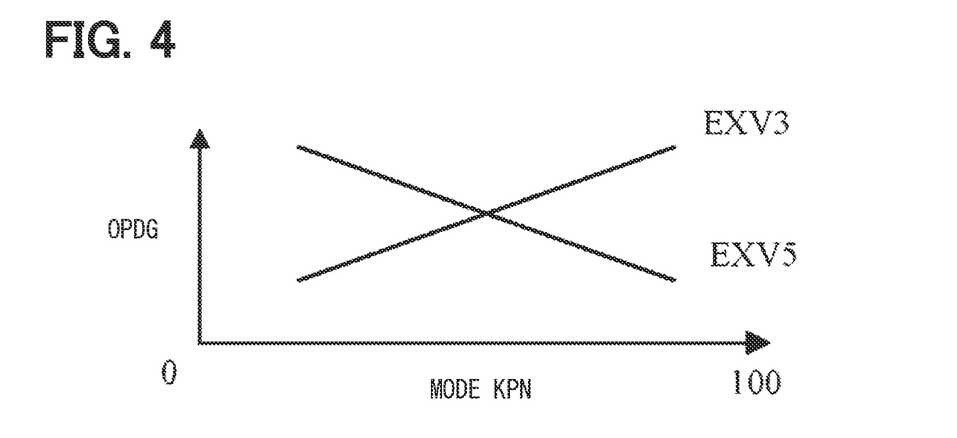
FIG. 4 is a graph showing opening degree control characteristics of a first expansion valve and a second expansion valve.

In this air conditioning control system, the opening degrees (OPDG) of the first expansion valve 3 and the second expansion valve 3 are one-to-one associated with the opening mode KPN by mathematical functions. The opening mode KPN is a concept introduced to indicate a difference between changes in the opening degrees (OPDG) of the two valves. For example, the opening degree relationship between the first expansion valve 3 (EXV3) and the second expansion valve 5 (EXV5) may be as shown in FIG. 4. That is, when the opening degree mode KPN is 0, the opening degree of EXV3 is the minimum and the opening degree of EXV5 is the maximum. Contrary, when the opening degree mode KPN is 100, the opening degree of EXV3 is the maximum and the opening degree of EXV5 is the minimum. The specific restrictions on the opening degree must be matched according to the difference in vehicles. If it is required to release more heat to the vehicle room, the opening mode KPN is decreased. That is, in this case, the opening degree of EXV3 is decreased and the opening degree of EXV5 is increased. By this operation, a large amount of heat can be absorbed by the outdoor heat exchanger 4 and discharged into the room. The reverse operation is also possible.

The heat pump air-conditioning system of the present disclosure performs a cooperative associated control for the combination of the expansion valve and the auxiliary heater according to the demand. Specifically, the operation described later is carried out. This disclosure mainly focuses on measures to be taken when the amount of heating is insufficient, and in the following example, a cycle in which the outdoor heat exchanger 4 absorbs heat in order to increase the amount of heating is described in detail.

In a case that dehumidifying in performed by a series connection, the air is first dehumidified through the indoor evaporator 6. The air is then heated through the heat exchanger 11. The air is then blown into the vehicle room. Specifically, the series-connected dehumidification cycle (in a case that the outdoor heat exchanger 4 absorbs heat) is as follows. The compressor 1 discharges a high-temperature and high-pressure gas refrigerant. The refrigerant passes through the water-cooled condenser 2 and dissipates heat to the water-cooled condenser 2 to be changed into a medium-temperature high-pressure liquid refrigerant. The refrigerant is changed into a medium-temperature gas-liquid mixed two-phase refrigerant by the first-stage expansion performed at the first expansion valve 3. The refrigerant absorbs heat externally when passing through the outdoor heat exchanger 4, and is changed into a medium-temperature two-phase refrigerant having a slightly lower temperature. Here, pressure loss acts. The refrigerant flows from the outdoor heat exchanger 4 to the second expansion valve 5. The refrigerant is changed into a low-temperature low-pressure two-phase refrigerant by the second-stage expansion performed at the second expansion valve 5. The refrigerant absorbs heat and dehumidifies the air-conditioning air in the vehicle at the indoor evaporator 6, and is changed into a refrigerant close to a low-temperature low-pressure gas. The refrigerant returns to the compressor 1 via the liquid tank 7.

The water-cooled condenser 2 transmits the thermal energy to the water and dissipates the thermal energy to the air for air-conditioning in the vehicle through the heat exchanger 11 provided in the vehicle. In addition, the water heater 10 installed in the water circuit can indirectly heat the vehicle room via the water circuit. For example, by installing a PTC electric heater upstream of the heat exchanger 11, it is possible to first convert electric power into thermal energy, and then heat the vehicle room through the heat exchanger 11. Instead of the water heater 10, the auxiliary heater may include a heater that directly heats the air for air-conditioning in the vehicle room.

In a case that the water heater 10 is not used, more heat must be absorbed by the indoor evaporator 6 in order to increase the thermal energy released into the vehicle room, and for that purpose, the opening degree of the first expansion valve 3 is decreased, and the opening degree of the second expansion valve 5 is increased. At the same time, the indoor evaporator 6 cannot go below 0 degrees Celsius to prevent freezing in the room. Therefore, the opening degree of the first expansion valve 3 is provided with a minimum position capable of preventing the indoor evaporator 6 from falling below 0 degrees Celsius. The minimum position can be set, for example, based on experimental values.

Based on the above configurations, the heat pump air-conditioning system of the present embodiment can perform the dehumidifying and heating function by using the auxiliary heater and increasing a cooperative associated control of the auxiliary heater and the expansion valves. In order to consider both the energy conservation property and comfort at the same time, the combination control of the following three types of modes can be executed for the opening control of the expansion valves and the output control of the auxiliary heater.

Mode 1 (MODE1) is also called an energy conservation mode (ECO). Mode 1 is also called a first mode. Mode 1 has sufficient heat pump capacity. Therefore, Mode 1 is provided by a single operation of the heat pump (HP-S) alone. Mode 1 adjusts the opening mode KPN based on the blowout temperature. That is, the opening degrees of the first expansion valve 3 and the second expansion valve 5 are adjusted based on the blowout temperature. At this time, the auxiliary heater is forcibly lowered in thermal output. Specifically, in Mode 1, the heat pump is operated. In addition, in Mode 1, the opening degrees of the first expansion valve 3 and the second expansion valve 5 are adjusted based only on the blowout temperature. For example, the opening degree of each expansion valve is adjusted based on the difference between the current blowout temperature (that is, the actual blowout temperature) and the target blowout temperature. In this Mode 1, it is possible to improve an efficiency by heating with a heat pump as much as possible.

Mode 2 (MODE2) is also called an energy conservation and auxiliary heating mode. Mode 2 is also called a second mode. Mode 2 has insufficient heat pump capacity. Therefore, Mode 2 is provided by a combined use of the energy conservation mode (ECO) and the auxiliary heating (ADHT) by the operation of the auxiliary heater. In Mode 2, the auxiliary heater is operated after holding the first expansion valve 3 and the second expansion valve 5 at predetermined opening degrees unchanged. At this time, the first expansion valve 3 and the second expansion valve 5 are maintained, for example, the first expansion valve 3 is maintained at the minimum opening degree and the second expansion valve 5 is maintained at the maximum opening degree. Further, the output power of the auxiliary heater is adjusted based on the blowout temperature. The output power of the auxiliary heater is controlled linearly or stepwise, for example, based on the difference between the current water temperature and the target water temperature. In Mode 2, in a situation where the heating of the heat pump is maximum, auxiliary heating is also executed by the auxiliary heater at the same time.

Mode 3 (MODE3) is also called a quick heating priority mode (QKHT). The quick heating priority mode is a mode adjusted to perform a faster heating in a priority manner than the other demands. Mode 3 is also called a third mode. Mode 3 is a mode in which variable control of the expansion valves and variable control of the auxiliary heater are used in combination. In Mode 3, both the opening degrees of the expansion valves 3 and 5 and the output of the auxiliary heater are adjusted based on the blowout temperature. In this mode 3, quick heating in the room can be performed by using the expansion valves and the auxiliary heater in a cooperatively associated manner.

The switching among the above three types of modes is determined based on the difference between the actual blowout temperature and the target blowout temperature and the opening degrees of the expansion valves 3 and 5 at that time.

Figure 2:
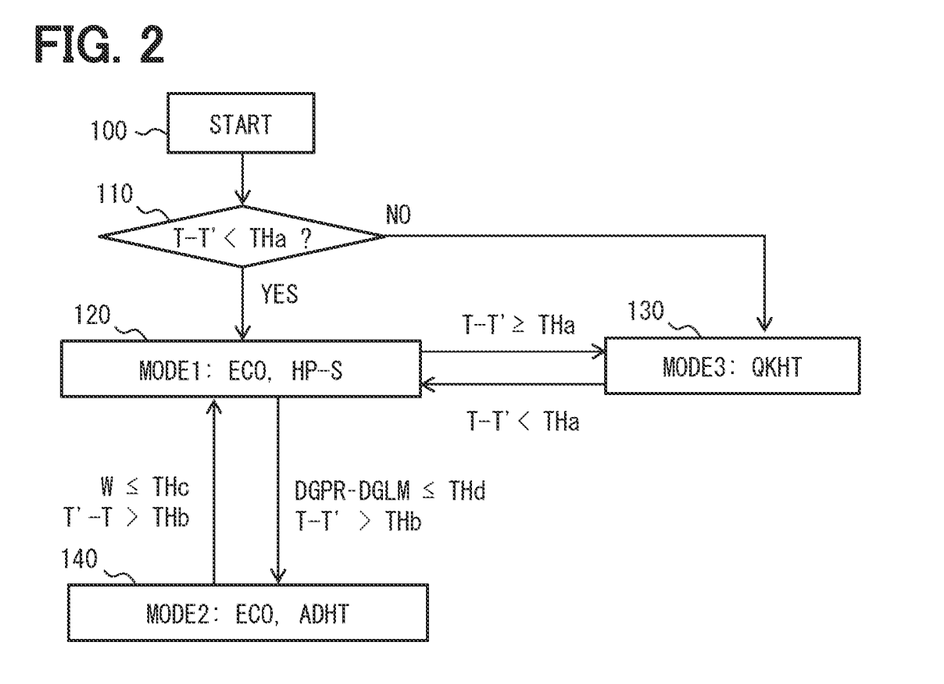
FIG. 2 is a flowchart showing a control method of the heat pump air-conditioning system for a vehicle.

FIG. 2 shows a flowchart of a control method of the heat pump air-conditioning system of the present embodiment. The heat pump air-conditioning system may be operated as a single cooling system, a single heating system, a series connection dehumidification mode, and an air-conditioning off state in a switchable manner. As shown in FIG. 2, air-conditioning is activated in step 100. FIG. 2 shows a case where the mode is switched to the series connection dehumidification mode after step 100. In step 110, first, the target blowout temperature T is compared with the measured actual blowout temperature T' at that time. The actual blowout temperature T' can be measured by a blowout temperature sensor provided at the air outlet portion in the vehicle room. The target blowout temperature T can be set based on, for example, a set temperature Tset input by the user, an indoor temperature Tr from the indoor temperature sensor, an ambient temperature Tam from the ambient air temperature sensor, is and the like. In this disclosure, method of setting the target blowout temperature T is not limited. The difference (T−T') between the target blowout temperature T and the actual blowout temperature T' and a magnitude of the predetermined first temperature threshold value THa are compared. The first temperature threshold value THa is a positive value. A feedback control is performed to control the actual blowout temperature T' to approach and maintain the target blowout temperature T by adjusting the opening degrees of the first expansion valve 3 and the second expansion valve 5 and adjusting the auxiliary heater based on the comparison result, and perform different modes of heat pump air-conditioning.

Specifically, as shown in FIG. 2, in step 110, it is determined that whether or not the difference (T−T') between the target blowout temperature T and the measured actual blowout temperature T' is lower than the first temperature threshold value THa. The value of the first temperature threshold value THa can be set based on an experimental value, for example, 10 to 15 degrees Celsius. In a case of T−T'<THa, it is determined that the temperature difference is small. In this case, the system enters Mode 1 at step 120 in order to save energy consumption. In step 120, the heat pump (HP) operates independently and the auxiliary heater is not activated. In a case of T−T'≥THa, it is determined that the temperature difference is large. In this case, in order to improve comfort, the system enters Mode 3 at step 130. In step 130, both the expansion valves 3 and 5 and the auxiliary heater are used together.

In the above, in a situation where T−T'<THa is established and Mode 1 is executed, the target blowout temperature T and the actual blowout temperature T' may be further compared in magnitudes. If T>T' is satisfied, the opening degree of the first expansion valve 3 is decreased and the opening degree of the second expansion valve 5 is increased so that the actual blowout temperature T' approaches and matches the target blowout temperature T. If T≤T' is satisfied, the opening degree of the first expansion valve 3 is increased and the opening degree of the second expansion valve 5 is decreased so that the actual blowout temperature T' approaches and matches the target blowout temperature T. In a situation where the above-mentioned T−T'≥THa is satisfied and Mode 3 is executed, the actual blowout temperature T' is controlled to approach and maintained the target blowout temperature T by controlling so that the opening is degree of the first expansion valve 3 is decreased and the opening degree of the second expansion valve 5 is increased.

Further, in a situation of Mode 1, in a case that a predetermined condition is satisfied, the heat pump air-conditioning mode can be switched to Mode 2. One of the predetermined conditions may be determined by comparing the measured opening mode KPN with the predetermined opening threshold value THd. The opening mode KPN of the first expansion valve 3 and the second expansion valve 5 is continuously measured in a real time manner. One of the predetermined conditions may be determined by comparing the difference T−T' between the target blowout temperature T and the actual blowout temperature T' is compared with a predetermined second temperature threshold value THb in magnitudes. The mode switching is performed in response to the simultaneous satisfaction of the two conditions. The second temperature threshold value THb is a positive value smaller than the first temperature threshold value THa. In a case that KPN≤THd is satisfied and T−T'>THb is satisfied, switching from Model to Mode 2 is performed. As a result, in step 140, the system enters Mode 2. At this time, the auxiliary heater is activated, and the opening degrees of the first expansion valve 3 and the second expansion valve 5 at present time are kept unchanged.

Specifically, as shown in FIG. 2, in a case that the expansion valve opening degree DGPR has already reached the limit DGLM in a situation of Mode 1, the difference between the current valve opening degree DGPR and the valve opening degree limit DGLM becomes being less than the threshold value THd (DGPR−DGLM≤THd). This condition is satisfied, for example, when the opening degree mode KPN has already reached 100. It is determined that whether or not the difference between the target blowout temperature T and the measured actual blowout temperature T' at that time is greater than the second temperature threshold value THb, that is, whether or not T−T'>THb is satisfied (T−T'>THb) is determined, In a case that both DGPR−DGLM≤THd and T−T'>THb are satisfied, the capacity of the heat pump is insufficient, and the mode is switched to the second mode. At this time, the auxiliary heater is activated, and the opening degrees of the first expansion valve 3 and the second expansion valve 5 at present time are kept unchanged. The value of the second temperature threshold value THb may be 1 to 3 degrees Celsius and can be set based on the experimental value. The opening degree threshold value THd can also be set based on the experimental value.

Further, in a situation of Mode 1, the actual blowout temperature T' of the air-conditioning air outlet portion is continuously measured in a real time manner. In addition, magnitudes of the difference T−T' between the target blowout temperature T and the actual blowout temperature T' and the predetermined first temperature threshold value THa are compared. In this case, the mode of heat pump air-conditioning is switched based on the comparison result. In a case that it is determined that T−T'≥THa is satisfied, that is, when it is determined that the temperature difference is large, switching from Mode 1 to Mode 3 is performed.

In a situation of Mode 2, the output power W of the auxiliary heater at present time is continuously measured in a real time manner. The measured output power W is compared with a predetermined power threshold value THc. Simultaneously, magnitudes of the difference T−T' between the target blowout temperature T and the actual blowout temperature T' and the predetermined second temperature threshold value THb are compared. The mode of heat pump air-conditioning is switched based on these comparison results. Specifically, it is determined that whether or not the output power W of the auxiliary heater is greater than the power threshold value THc. Here, it is determined that whether or not W≤THc is satisfied. It is determined that whether or not the difference between the measured actual blowout temperature T' and the target blowout temperature T at that time is higher than the second temperature threshold value THb, that is, it is determined that whether or not T−T'>THb is satisfied. When these a plurality of conditions are satisfied at the same time, the heat pump has sufficient capacity and the mode can be switched to Mode 1. The value of the power threshold value THc can be set between 100 and 500 watts. The power threshold value THc can be set based on the experimental value.

In a situation of Mode 3, the actual blowout temperature T' of the air-conditioning air outlet portion is continuously measured in a real time manner. Further, the difference T−T' between the target blowout temperature T and the actual blowout temperature T' is compared with the predetermined first temperature threshold value THa. The mode of heat pump air-conditioning is switched based on the comparison result. Specifically, when the difference between the target blowout temperature T and the measured actual blowout temperature T' at present time is less than the first temperature threshold value THa, that is, when T−T'<THa is satisfied, switching from Mode3 to Mode 1 is performed.

The plurality of threshold values described above have exemplary values. At each temperature threshold, the first temperature threshold value THa is a relatively large value. If the temperature difference is fairly large, additional involvement by the auxiliary heater is performed to achieve quick heating. The second temperature threshold value THb is a relatively small value. The second temperature threshold value THb is set to have a gap value for imparting a hysteresis characteristic in order to take into account an error caused by the system fluctuation of itself and to control so that the switching between the two modes is not repeated frequently.

In the flowchart shown in FIG. 2, the control unit 20 described later is configured to start operation from a first mode or a third mode after being started. The control unit 20 is configured to be able to switch between the first mode and the third mode in both directions in a continuous operation state. The control unit 20 is configured to be able to switch between the first mode and a second mode in both directions in a continuous operation state. The control unit 20 is configured to switch between the second mode and the third mode via the first mode.

Figure 3:
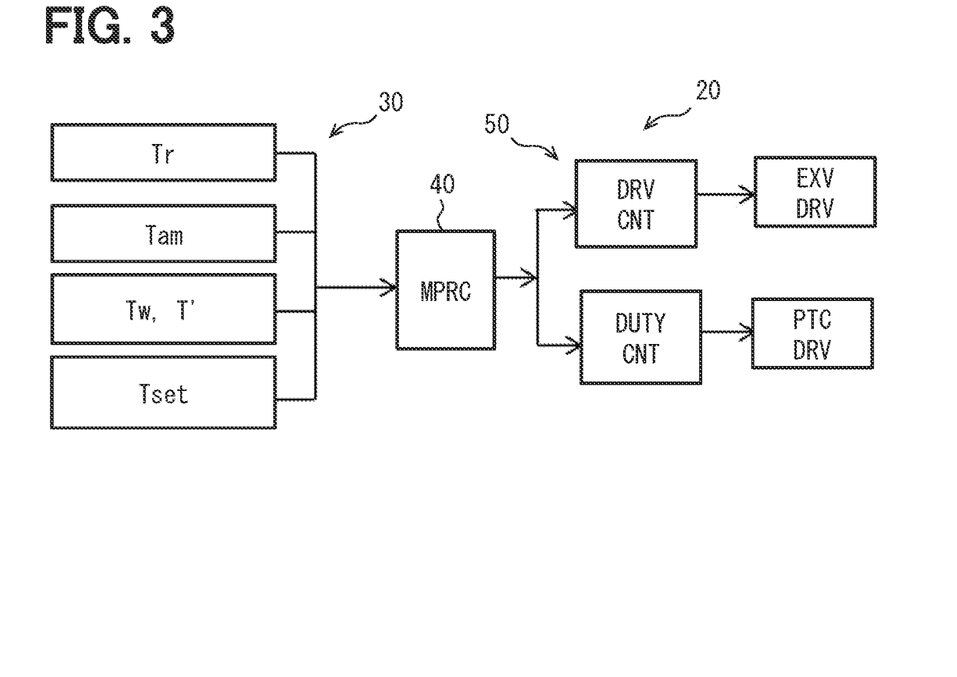
FIG. 3 is a schematic control block diagram of the heat pump air-conditioning system for a vehicle.

The operations of the expansion valves 3 and 5 and the auxiliary heater in each of the above modes can be controlled by the control unit 20 of the heat pump air-conditioning system for a vehicle. FIG. 3 shows a schematic block diagram of the heat pump air-conditioning system of the present embodiment. As shown in FIG. 3, the heat pump air-conditioning system of the present embodiment includes the control unit 20. The control unit 20 controls a plurality of elements including the first expansion valve 3, the second expansion valve 5, and the auxiliary heater. The control unit 20 includes an input sensor group 30, a microprocessor circuit 40, and an actuator group 50 including driver circuits. The input sensor group 30 includes temperature detection units such as an in-vehicle temperature sensor, an ambient air temperature sensor, and a water temperature/blowout temperature sensor. The water temperature/blowout temperature sensor provides temperature data that directly or indirectly indicates the blowout temperature T'. The input sensor group 30 further includes a temperature setting device which is operable by a user for setting a set temperature. The microprocessor circuit 40 can receive temperature data from the input sensor group 30. The microprocessor circuit 40 can also receive data indicating the set temperature. The microprocessor circuit 40 inputs the set temperature Tset, the indoor temperature Tr, the ambient temperature Tam, the water temperature Tw, the blowout temperature T' and the like. The microprocessor circuit 40 can set the target blowout temperature T based on input data. The microprocessor circuit 40 may control the expansion valves 3 and 5 (EXV-DRV) and the auxiliary heater (PTC electric heater) (PTC-DRV) based on the target blowout temperature T and the actual blowout temperature T'.

The microprocessor circuit 40 is an electronic controller. The control unit 20 comprises at least one processor circuit, One example of a processor circuit is a processor circuit that executes a program as a collection of a plurality of instructions. The processor circuit is a so-called microprocessor and is provided as a chip. The controller includes at least one non-transitory tangible storage medium for storing a program and data. The processor circuit provides functions of the device according to this disclosure by executing a program. Another example of a processor circuit is a processor circuit including a plurality of logic circuits or analog circuits. A plurality of logic circuits or analog circuits are configured to provide a plurality of substantive elements and their electrical connections so as to provide the functions of the apparatus according to this disclosure, The processor circuit may be called various names such as accelerators, gate arrays, and FPGAs (Field-Programmable Gate Arrays). The controller is also called a microcontroller or a microcomputer.

In this embodiment, the control unit can drive the expansion valves by, for example, driver circuits connected to the expansion valves. Further, the control unit can drive the PTC electric heater by controlling the duty ratio of the PTC electric heater, Currently, the mainstream control method for electric heater is duty ratio control. It is possible to know the output at present time based on the nominal value of the electric heater and the duty ratio at present time, and to adjust the output value by adjusting the duty ratio. Drive controls (EXV-DRV) of the expansion valves 3 and 5 are executed via drive circuits (DRV-CNT). Control of the auxiliary heater is executed via the duty drive circuit (DUTY-CNT).

The drive control of the expansion valve and the PTC electric heater is not limited to the above means. For example, it is possible to adjust the opening degree of the expansion valve and the output power of the PTC electric heater based on a difference between the water temperature and a target water temperature. The method of providing these functions is not limited to a method such as duty ratio control.

Second Embodiment

Figure 5:
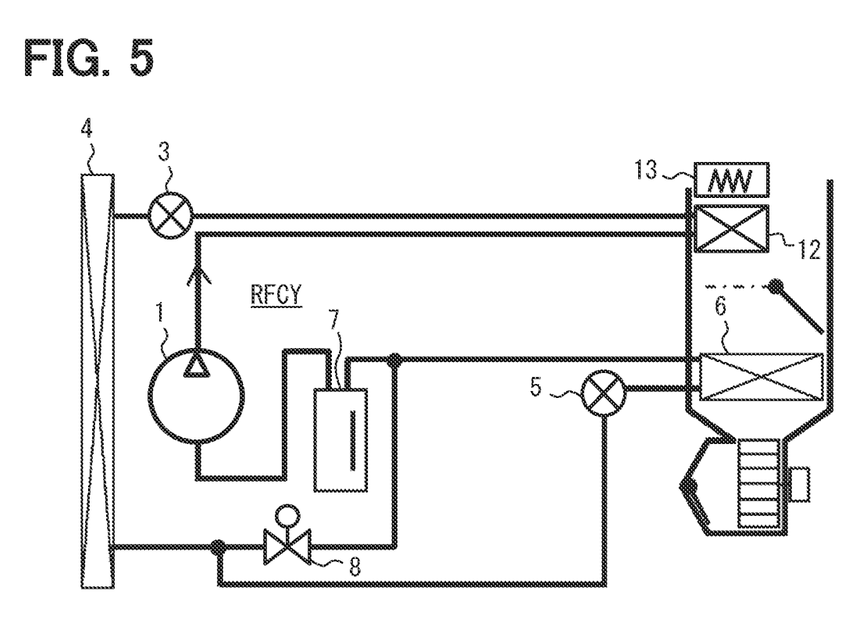
FIG. 5 is a block diagram showing a heat pump air-conditioning system for a vehicle according to a second embodiment.

FIG. 5 shows a schematic structural diagram of a heat pump air-conditioning system for a vehicle based on a second embodiment of the disclosure. The second embodiment shown in FIG. 5 is a modification of the simple system of the embodiment shown in FIG. 1. The embodiment shown in FIG. 5 does not include the water-cooled condenser 2. The heat pump air-conditioning system includes an in-vehicle condenser 12 instead of the water-cooled condenser 2. In this embodiment, heat is dissipated to the air in the vehicle room by directly using the condenser 12 in the vehicle located in the air conditioning box in the vehicle room. The indoor condenser 12 is a heat exchanger between the refrigerant and air.

The heat pump air-conditioning system of the present embodiment has a refrigerant circuit RFCY, The refrigerant circuit RFCY includes a compressor 1, an indoor condenser 12, a first expansion valve 3, an outdoor heat exchanger 4, a second expansion valve 5, an indoor evaporator 6, and a liquid tank 7 connected in this order. The refrigerant circuit RFCY includes a two-way valve 8 installed in parallel with a series circuit, which includes the second expansion valve 5 and the indoor evaporator 6. In addition, an air heater 13 is further provided as the auxiliary heater in the air conditioning box. In this embodiment, the air heater 13 is provided downstream of the indoor condenser 12. The air first passes through the indoor condenser 12, and the air is reheated by the air heater 13 in a case that an air temperature is insufficient.

In this embodiment, the air heater 13 is used instead of the water heater 10. Since the cooperative associated control of the auxiliary heater and the expansion valves executed in the present embodiment is similar to that of the first embodiment, it is not described repeatedly here.

This disclosure can be embodied in various forms without departing from the basic characteristics of this disclosure. The embodiments in this disclosure are not limiting and are used only as illustrations for illustration purposes. The scope of this disclosure is limited by the claims, not the specification, and it should be understood that all modifications within scopes defined by the claims and within scope equivalent of scopes defined by the claims are included in the claims.

What is claimed is:

1. A heat pump air-conditioning system for a vehicle, comprising:
   a refrigerant circuit which heats air directly or indirectly and includes a compressor, a first heat exchanger, a first expansion valve, a second heat exchanger, a second expansion valve, a third heat exchanger, and a liquid tank connected in this order, and a two-way valve installed in parallel with a series connection of the second expansion valve and the third heat exchanger;
   an auxiliary heater which heats air directly or indirectly; and
   a control unit which includes at least one processor circuit and controls a plurality of elements including the first expansion valve, the second expansion valve, and the auxiliary heater, wherein
   the control unit is configured to:
   set a target blowout temperature of air-conditioning;
   obtain an actual blowout temperature of an air-conditioner air outlet;
   compare a difference between a target blowout temperature and an actual blowout temperature with a predetermined first temperature threshold value in magnitudes, the first temperature threshold value being a positive value; and
   control the actual blowout temperature to approach to and maintain at the target blowout temperature by performing different modes of heat pump air-conditioning, by adjusting an opening degrees of the first expansion valve and the second expansion valve and adjusting the auxiliary heater based on a result of comparing the difference.

2. The heat pump air-conditioning system claimed in claim 1, further comprising:
   a water circuit, wherein
   the auxiliary heater is installed in the water circuit and is used to heat the water, and wherein
   the water circuit includes:
   a water pump which pumps and circulating water; and
   a fourth heat exchanger which perform heat exchange with air to be introduced into a vehicle room, wherein
   the refrigerant circuit and the water circuit performs heat exchange, the water being heated/cooled via the refrigerant, at the first heat exchanger, and wherein
   the heated/cooled water is used to heat/cool the air to be introduced into the vehicle room at the fourth heat exchanger.

3. The heat pump air-conditioning system claimed in claim 1, wherein
   the control unit is configured to:
   compare a difference between a target blowout temperature and an actual blowout temperature with a predetermined first temperature threshold value in magnitudes;
   execute different modes based on a result of comparing the difference;
   perform a first mode in a case that the difference is less than the first temperature threshold value, the first mode being performed by not activating the auxiliary heater and adjusting both the opening degree of the first expansion valve and the opening degree of the second expansion valve; and
   perform a third mode in a case that the difference is equal to or greater than the first temperature threshold value, the third mode being performed by activating the auxiliary heater and adjusting both the opening degree of the first expansion valve and the opening degree of the second expansion valve.

4. The heat pump air-conditioning system claimed in claim 3, wherein
the control unit is configured to:
further compare the target blowout temperature with the actual blowout temperature in magnitudes in a situation where the difference is less than the first temperature threshold value and the first mode is performed;
control the actual blowout temperature to approach to and maintain at the target blowout temperature by decreasing the opening degree of the first expansion valve and increasing the opening degree of the second expansion valve in a case that the target blowout temperature is greater than the actual blowout temperature;
control the actual blowout temperature to approach to and maintain at the target blowout temperature by increasing the opening degree of the first expansion valve and decreasing the opening degree of the second expansion valve in a case that the target blowout temperature is equal to or less than the actual blowout temperature; and
control the actual blowout temperature to approach to and maintain at the target blowout temperature by decreasing the opening degree of the first expansion valve and increasing the opening degree of the second expansion valve in a situation where the difference is equal to or greater than the first temperature threshold value and the third mode is performed.

5. The heat pump air-conditioning system claimed in claim 3, wherein
the control unit is configured to:
measure an opening mode for the first expansion valve and the second expansion valve continuously in a real time manner in a situation where the first mode is performed;
compare a measured opening mode with a predetermined opening threshold value;
compare a difference between the target blowout temperature and the actual blowout temperature with a predetermined second temperature threshold value in magnitudes, the second temperature threshold value being a positive value less than the predetermined first temperature threshold value;
switch heat pump air-conditioning modes based on a comparison result; and
switch to a second mode in a case that the opening mode is equal to or less than the opening threshold value and the difference is greater than the second temperature threshold value, in this mode the auxiliary heater being activated and both the opening degree of the first expansion valve and the opening degree of the second expansion valve being maintained unchanged.

6. The heat pump air-conditioning system claimed in claim ,5 wherein
the control unit is configured to:
measure an output power of the auxiliary heater at present time continuously in a real time manner in a situation where the second mode is performed;
compare a measured output power with a predetermined power threshold value;
compare a difference between the actual blowout temperature and the target blowout temperature with a predetermined second temperature threshold value in magnitudes;
switch the heat pump air-conditioning mode based on a comparison result; and
switch to the first mode in a case that the output power is equal to or less than the power threshold value and the difference is greater than the second temperature threshold value.

7. The heat pump air-conditioning system claimed in claim 4, wherein
the control unit is configured to:
measure the actual blowout temperature of an air-conditioning air outlet portion is continuously measured in a real time manner in a situation where the first mode is performed;
compare the difference between the target blowout temperature and the actual blowout temperature with a predetermined first temperature threshold value in magnitudes;
switch heat pump air-conditioning modes based on a comparison result;
switch to the third mode in a case that the difference is equal to or greater than the first temperature threshold value;
measure the actual blowout temperature of the air-conditioning air outlet portion is continuously measured in a real time manner in a situation where the third mode is performed;
compare a difference between the target blowout temperature and the actual blowout temperature with a predetermined first temperature threshold value in magnitudes;
switch the heat pump air-conditioning mode based on a comparison result; and
switch to the first mode in a case that the difference is less than the first temperature threshold value.

8. The heat pump air-conditioning system claimed in claim 1, wherein
the auxiliary heater is a PTC electric heater.

9. The heat pump air-conditioning system claimed in claim 1, wherein
the mode includes a first mode, a second mode, and a third mode, and wherein
the first mode is an energy conservation mode, and wherein
the second mode is an energy conservation and auxiliary heating mode, and wherein
the third mode is a quick heating priority mode.

10. The heat pump air-conditioning system claimed in claim 9, wherein
the control unit is configured to:
switch between the first mode and the third mode in both directions;
switch between the first mode and the second mode in both directions; and
switch between the second mode and the third mode via the first mode.

* * * * *